March 5, 1968     W. E. BOWERS     3,371,474
METHOD AND APPARATUS FOR FORMING ARMORED CABLES
Filed April 21, 1966
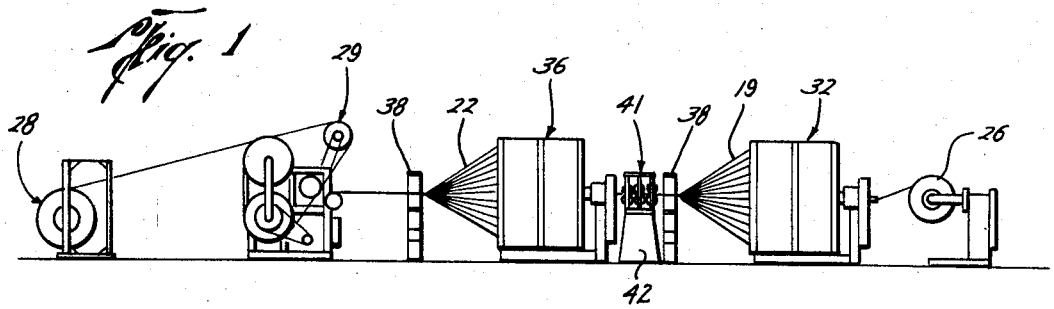
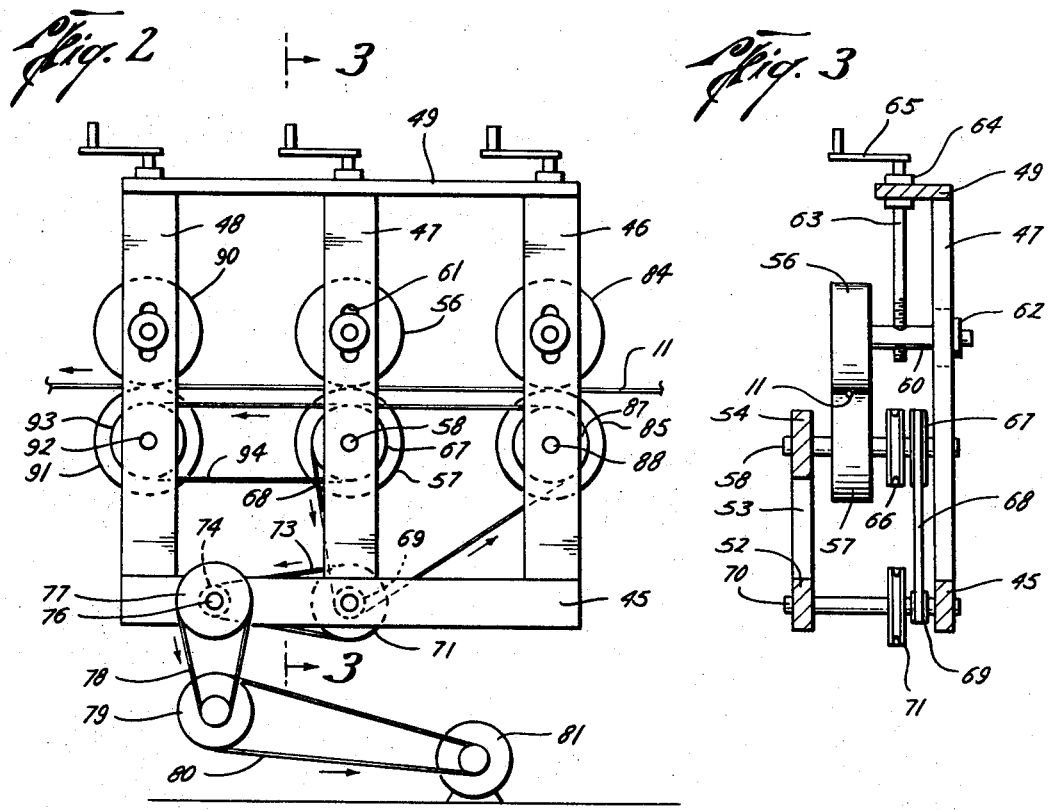
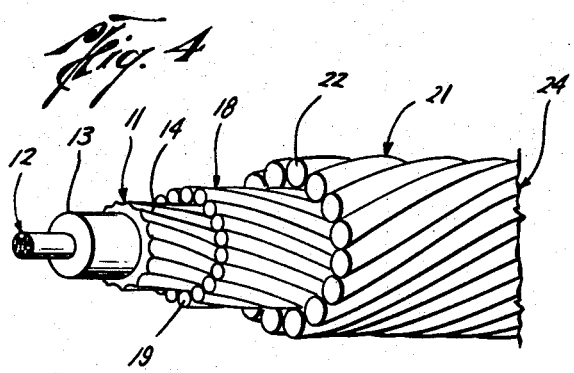
William E. Bowers
INVENTOR.
BY Harris and Larkin
ATTORNEY

United States Patent Office 3,371,474
Patented Mar. 5, 1968

3,371,474
METHOD AND APPARATUS FOR FORMING ARMORED CABLES
William E. Bowers, Houston, Tex., assignor to Schlumberger Technology Corporation, Houston, Tex., a corporation of Texas
Filed Apr. 21, 1966, Ser. No. 544,156
10 Claims. (Cl. 57—15)

This invention relates to a method and apparatus for forming armored cables. More particularly, this invention relates to a method and apparatus for making an armored cable having a central core with at least two layers of superposed oppositely wound spiral layers of armor wire strands thereabout. The armored cables of this invention are of particular utility and are of the type employed in the logging of bore holes drilled into earth formations and the like.

In the performance of well logging and other similar subsurface operations, instruments are lowered into bore holes, often to depths of 20,000 feet or more, by means of an armored cable which is spooled upon a mobile field unit. The physical conditions to which such cables are subjected by the bore hole environment may be extremely harsh. For example, the cable is subject to severe abrasion by contact with the bore hole wall. Temperatures of 350° F. or more are not uncommon in very deep bore holes. The hydrostatic pressure of the drilling fluid within the bore hole may reach 10,000 lbs. per square inch in even a comparatively shallow well. The fluids within the bore hole are often extremely saline; and the cable may be subjected to chemical degradation by oil, gas or other chemicals. Under such conditions, a well logging cable must perform satisfactorily the functions of: (1) a wire rope having sufficient strength to support its own weight and the weight of the bore hole instruments plus an additional margin of strength to provide for emergency tensions and a reasonable safety factor; (2) a conductor transmission line or multiple conductor transmission line to conduct electrical power and signals between the bore hole instruments and the surface equipment without excessive electrical leakage or signal attenuation; and (3) a depth measuring line to locate the bore hole instrument accurately with respect to a surface datum. Moreover, to satisfy the requirements of mobility and length, the cables must be of relatively small diameter and lightweight.

The above requirements have lead to a general form of construction in well logging cables which comprises at least two concentric layers of load-bearing metallic armor wire strands helically wound in opposite directions about a core which contains one or more insulated electrical conductors. One important and desirable characteristic of this type of cable which are sometimes referred to as double armored cable is that the outer armor remain in intimate contact with the inner armor under all normal tension conditions experienced by the cable. When the outer armor loses contact with the inner armor, or becomes loose, the outer armor will wear eradicately and will milk down as it passes through packing glands, lubricators and the like, and which, in extreme cases causes "bird-caging."

Utilizing prior art methods and apparatuses and under the best of circumstances, it has been difficult to obtain cable having tight armor wire. The problem of loose armor wire is further increased by the use of new high temperature non-compressible cores within the armored cable as well as the trend toward the use of larger diameter wire strands in the inner armor layer.

It is to be understood that the term "loose armor" is defined as a condition which exists where the outer armor loses contact with the inner armor. Under this condition the wire or wires can be carrying no tension load, i.e., the tension in any loose wires is zero or negative and may be in compression. When a gap results between the inner and outer layers of the armored cable, i.e., when loose armor occurs, it is possible for the drilling mud or fluid to flow into and remain in this space. This can result in the formation of "lumps" in the cable which cause excessive localized wear of the outer armor and reduction in cable breaking strength. In addition, this accumulation of mud can cause unusual shrinkage of the cable length which detrimentally effects the accuracy of the depth measuring operation referred to above. In some instances, the mud or dirt between the layers of armor may prevent the cable from returning to its original state after it has been subjected to tension forces, again, limiting the useful life and serviceability of the cable.

It is therefore, an object of this invention to provide an improved method and apparatus for forming armored cable of the type described which cable is less subject to having loose armor and which will provide a cable having greater serviceability.

Briefly stated, the method of this invention for making armored cables having at least two oppositely wound spiral layers of armor wire strands superimposed about a core includes the steps of pulling the core through a predetermined line of travel. During said pulling, a first layer of spirally wound wire strands is wrapped around the core at a first station. A second layer of superposed wire strands is then spirally wrapped about the core in a generally opposite direction at a second station spaced apart from the first station and along the line of travel. At a point along the line of travel and after the application of the first layer and before the application of the second layer, a predetermined pulling force is applied to the core and first layer of wire strands in the direction of travel of the core, whereby tension forces on the core and first layer are reduced as the cable passes this pulling station.

Briefly stated, the apparatus of the present invention for making armored cables having at least two oppositely wound spiral layers of armor wire strands surrounding a central core member includes payout means for paying out the central core along a predetermined line of travel. Spaced apart from the payout means and along the line of travel cable take up means are provided for pulling the core through the line of travel. First wrapping means are spaced between the payout means and the take up means for applying a first layer of armor wire strands about the core in a first spiral direction. Second wrapping means are spaced between the first wrapping means and the take up means for applying a second layer of superposed armor wire strands around the first layer in a generally opposite spiral direction. The apparatus also includes pulling means mounted between the first and second wrapping means for pulling on the core and first layer of armor wire strands in the direction of travel thereof, to thereby reduce tension forces thereon as the cable passes thereby.

Reference to the drawings will further explain the invention wherein like numerals refer to like parts and in which:

FIG. 1 is a schematic representation of the layout of one embodiment of the apparatus of this invention.

FIG. 2 is an enlarged side elevation view of the pulling means of the invention shown in FIG. 1.

FIG. 3 is a cross-sectional view taken at line 3—3 of FIG. 2.

FIG. 4 is a perspective view of a typical armored cable constructed in accordance with the invention with successive components broken away to show the details of the cable construction.

Referring now to FIG. 4, the central core 11 may, for example, be comprised of a central insulated conductor 12 having a plurality of copper conductors therethrough and surrounded by a plastic coating 13 of a material such as Teflon over which is layed a water resistant jacket 14 of a material such as neoprene or the like.

Superposed about core 11 is a first layer 18 comprising a plurality of metallic wire strands 19 wrapped in a right hand lay thereabout and forming what may be sometimes referred to as the inner armor.

Superposed about first layer 18 is a second layer 21 comprising a plurality of metallic wire strands 22 having a left hand lay which may sometimes be referred to as the outer armor. The completed armored cable, as shown in FIG. 4, may sometimes be referred to by the numeral 24. For purpose of convenience, the term "cable" may sometimes be used to refer to central core 11 separately or the central core with one or two layers of armor superposed thereabout.

Referring now to FIG. 1, one preferred embodiment of the apparatus of the present invention will be described in detail. The apparatus is provided with payout means in the form of payout reel 26, which is adapted for paying out central core member 11 along a predetermined line of travel which is hereinafter described.

At the opposite end of FIG. 1, cable take up means in the form of take up reel 28 and capstan 29 are mounted along the line of travel of the cable and are adapted for drawing or pulling the core from reel 26 and through the aforesaid line of travel.

First wrapping means in the form of rotatable spool frame 32 is spaced between payout reel 26 and capstan 29 and is adapted for applying a plurality of wire strands 19 under tension forces in a spiral superposing layer around core 11 during passage therethrough.

A second wrapping means in the form of spool frame 36 is spaced between spool frame 32 and capstan 29 and is similarly adapted for applying a second superposing layer of armor wire strands 22 while under tension forces in a spiral direction generally opposite from the direction of the inner armor. Spool frames 32 and 36 are adapted to rotate in opposite directions whereby wire strands 19 are provided with a right hand lay and wire strands 22 are provided with a left hand lay.

Each of the spool frames 32 and 36 is of conventional construction and well known in the art, and may have associated therewith a forming unit such as forming units 38 which are adapted to roll or otherwise form the cable in the desired shape. Each of the spool frames 32 and 36 is provided with a plurality of spools of wire strands having adjustable brake means so that the tension which is applied to the wire strands as they are wound onto the cable may be controlled to a predetermined extent. It may be stated that all of the foregoing elements of the apparatus heretofore described are of conventional design and are well known to those skilled in the art.

The apparatus of this invention includes in combination with the foregoing elements a puller unit 41 which provides one novel apparatus for performing the method herein taught. Puller unit 41 may be mounted upon any appropriate support stand 42 such that the pulling elements which are hereinafter described and which form a part of puller unit 41 may frictionally engage the external surface of the cable and exert a pulling force thereon in the direction of travel of the cable, which pulling force is exerted at a point spaced along the line of travel of the cable and between rotating spool frames 32 and 36 as shown.

Referring now to FIGS. 2 and 3, puller unit 41 will be explained in detail. Lower frame member 45 is mounted upon stand 42 and has connected thereto three uprights 46, 47 and 48, the upper ends of which are attached to upper frame member 49.

Spaced apart from lower frame 45 and generally parallel therewith is another lower frame member 52 which has connected thereto and extending upwardly therefrom uprights 53, the upper ends of which connect to another upper frame member 54, as best shown in FIG. 3.

Each of the uprights 46, 47 and 48 has secured thereto gripping means which are adapted for gripping central core 11 which has inner first layer 18 superposed thereabout for the purpose of exerting a pulling force as will be explained hereinafter.

Upright 47 has connected thereto a pair of spaced apart wheels in the form of pneumatic tires 56 and 57 which are adapted to frictionally engage opposite sides of core 11 as it passes therethrough. Tire 57 is mounted on axle 58 the ends of which are journaled for rotation in upright 47 and upper frame member 54. Tire 56 is rotatably mounted upon wheel mount 60 which passes through vertical slot 61 in upright 47. Wheel mount 60 is provided with an enlarged head 62, such that mount 60 may be moved vertically up and down in slot 61. Wheel mount 60 also has connected thereto and threaded therein shaft 63 which is connected to thrust bearing 64 mounted in upper frame member 49 for rotation therein. The upper end of shaft 63 is connected to turning crank handle 65. Thus, by turning handle 65 tire 56 may be raised or lowered with respect to tire 57. Hence, when pulling unit 41 is being installed in position, tire 56 would be raised relative to tire 57 by turning handle 65. When pulling unit 41 is placed in position, tire 56 can be lowered by turning handle 65 with the result that the external surfaces of tires 56 and 57 frictionally engage opposite sides of core 11. This also permits adjustment for accommodating different size cables.

Means are also provided for rotating tires 56 and 57 in the direction of travel of core 11 such that a pulling force is exerted thereon. Accordingly, shaft 58 has frictionally mounted thereon pulleys 66 and 67. Pulley 67 is driven by a V-belt 68 which connects with reduction pulley 69 fixedly mounted on axle 70, the ends of which are journaled for rotation in lower frame members 45 and 52.

Axle 70 has attached thereto a larger pulley 71 which connects by belt 73 to smaller pulley 74 similarly mounted on another shaft or axle 76 spaced apart from axle 70 and journaled for rotation in lower frame members 45 and 52. Axle 76 has fixedly secured thereto a larger pulley 77 which connects by belt 78 to another reduction pulley 79 which in turn connects by belt 80 to electrical motor 81. It is to be understood that motor 81 is an adjustable constant torque motor, i.e., a motor that delivers the same torque regardless of motor speed, within a known speed range. Therefore the pull on core 11 does not vary with the speed of the armoring machine or the speed of core 11 through the pulley device. Motor 81 is connected to an electrical source through an adjustable rheostat. The rheostat is set so that a predetermined amount of pull can be applied to core 11. Hence, motor 81 drives belt 80 which turns reduction pulley 79 which drives pulley 77 through belt 78 which drives pulley 74, which in turn drives pulley 71 which in turn drives pulley 69, which drives pulley 67 through belt 68.

Upright 46 also has a pair of spaced apart tires 84 and 85 which are mounted in a manner similar to tires 56 and 57. Pulley 87 is mounted on a common axle 88 with tire 85 and has passing thereover belt 68, such that tires 57 and 85 are rotated at the same rate of speed and in the same direction.

Upright 48 also has a pair of spaced apart tires 90 and 91 which are mounted in similar fashion to tires 56 and 57. Tire 91 is mounted on common axle 92 with pulley 93, which is driven by another belt 94 which passes over pulley 66 such that tire 91 is driven in the same direction and speed as tire 57.

During operation of puller units 41, each of the pair of tires 56 and 57, 84 and 85 and 90 and 91, will frictionally engage core 11 at the outer edges thereof and thereby apply a predetermined tension or pulling force in the direction of travel of core 11. The result is that the tension forces on core 11 are reduced immediately at the point where core 11 leaves contact with tires 90 and 91. The peripheral speed of rotation of the tires is such that it will be less than the speed of travel of core 11 to avoid any bunching occurring immediately after leaving tires 90 and 91.

Referring now to FIG. 1, during operation of the apparatus of this invention, core 11 will be payed out from payout reel 26, passing through spool frame 32 where it is wrapped with a first layer 18 of wire strands 19, then through forming unit 38, then through puller unit 41 wherein a predetermined pulling force is applied thereto in the direction of travel of core 11, then through spool frame 36 where second layer 21 of wire strands 22 are superposed over first layer 18. Since spool frames 32 and 36 are rotating in opposite directions, wire strands 19 and 22 are wrapped in opposite spiral directions. The completed or made up armored cable then passes through another forming unit 38, to capstan 29 to take up reel 28.

The amount of pull which is exerted by puller unit 41 is selected such that the tension forces on cable 11 and first layer 18 just after it passes through core 41 is considerably reduced. The result is that the total tension forces on puller unit 11 at the point where second layer 21 is supplied by spool frame 36 is comparable to the tension forces exerted on core 11 at the point where first layer 18 is applied by spool frame 32.

The result is that the tension relationships between the inner and outer armor layers 18 and 21 can be maintained such that there will be a substantial reduction if not elimination of loose armor problems and insures tight armor wire under all conditions of machine friction, core construction and the like. Thus, it is now possible to produce a double armored cable wherein the inner armor and the outer armor are properly balanced, such that when tension is removed therefrom the tension forces exerted on both the inner and outer armor layers become zero at substantially the same time with the outer armor still remaining in contact with the inner armor, thereby reducing the number of loose armor malfunctions.

The apparatus and invention described above have particular utility during the armoring of certain types of cable wherein larger inner armor wires are used than outer armor wires. The larger inner armor wires are desirable from a strength-torque balance and corrosion resistance point of view. However, the greater effort required to preform these larger wires on small diameter cable cores is one of the main causes of excessive inner armor tension which results in loose armor. Hence, the use of the foregoing invention will permit the reduction of this excessive inner armor tension prior to application of the outer armor with the result that there is better balancing between tension forces on the inner and outer armor. The limits on the tension conditions that must be maintained if the finished cable is to have tight outer armor under zero tension, is for both the inner armor and the outer armor layers to reach zero tension at the substantially same time after a load is removed therefrom. By controlling the amount of tension applied to the core and armor layers during make up, these tension forces can be properly balanced as explained above.

Double armored cable made according to the foregoing invention has proved very satisfactory in use and has withstood repeated use without presenting a loose armor problem in most instances.

Modifications may be made in the invention as particularly described without departing from the scope of the invention. Accordingly, the foregoing description is to be construed as illustratively only and is not to be construed as a limitation upon the invention as defined in the following claims.

What is claimed is:

1. An apparatus for making armored cable having at least two oppositely wound spiral layers of armor wire strands surrounding a central core, comprising in combination:
    payout means for paying out the central core along a predetermined line of travel;
    cable take up means spaced apart from the payout means and along the line of travel for pulling the core along said line of travel;
    first wrapping means spaced between the payout means and the take up means for applying a first layer of armor wire strands about the core in a first spiral direction;
    a second wrapping means spaced between the first wrapping means and the take up means for applying a second superposed layer of armor wire strands around the first layer in a generally opposite spiral direction;
    and pulling means mounted between the first and second wrapping means for pulling on the core and first layer of armor wire strands in the direction of travel thereof, to thereby reduce tension force thereon as the cable passes thereby.

2. The apparatus as claimed in claim 1 wherein said pulling means includes:
    gripping means for frictionally engaging the cable and applying a predetermined pulling force thereto.

3. The apparatus as claimed in claim 1 wherein said pulling means includes:
    at least one pair of wheels having the rotating axes thereof spaced on opposite sides of said cable, said axes being in a line generally transverse to the line of travel of said cable and said wheels adapted for frictionally engaging opopsite sides of said cable;
    and adjustable constant torque drive means connected to drive at least one wheel of said pair in the direction of travel of said core.

4. The apparatus as claimed in claim 1 wherein said pulling means include:
    at least two pairs of pneumatic tires spaced in a series along the line of travel of said core and first wrapping, with the tires of each pair frictionally engaging opposite sides of said cable;
    and adjustable constant torque drive means connected to drive at least one tire of each pair in the direction of travel of said cable.

5. The apparatus as claimed in claim 3 including:
    means for varying the spacing between the wheels in said pair to accommodate different size cables and to vary the frictional engagement of the wheels with the cable.

6. An apparatus for making armored cable having at least two oppositely wound spiral layers of armor wire strands surrounding a central core, comprising in combination:
    payout means for paying out the central core along a predetermined line of travel;
    cable take up means spaced apart from the payout means for pulling the core along said line of travel;
    a pair of rotatable frames spaced apart and in series along said line of travel and between said payout means and said take up means and adapted to rotate in opposite directions around the cable, each of said frames having a plurality of spools of wire strands and means for applying said wire strands while under tension forces in a spiral superposing layer around the cable as the cable passes therethrough;
    pulling means spaced between said pair of rotatable frames for frictionally engaging and exerting a pulling force on the cable in the direction of travel thereof, said pulling means including at least one pair of tires with the outer edge of each tire frictionally engaging opposite sides of said cable;
    and adjustable constant torque drive means connected to drive at least one tire in each pair in the direction of travel of said cable, to thereby apply a predetermined pulling force to the cable to reduce the tension force on the cable as it passes through said pulling means.

7. The method of making armored cable having at least two oppositely wound spiral layers of armor wire strands superposed around a core comprising the steps of:
pulling the core through a predetermined line of travel;
wrapping a first layer of spirally wound wire strands about the core at a first station;
wrapping a superposing second layer of wire strands spirally wound in a generally opposite direction about the core at a second station spaced apart from the first station and along said line of travel;
and applying a predetermined pulling force to the core and the first layer of wire strands in the direction of travel of the core at a point along said line of travel and after the application of the first layer and before the application of the second layer.

8. The method as claimed in claim 7 wherein:
each of said wire strands is subjected to tension force during the wrapping thereof.

9. The method as claimed in claim 7 wherein:
the pulling force applied between said wrapping steps is a substantially constant force applied by gripping the external surface of said first layer.

10. The method of making armored cable having at least two oppositely wound spiral layers of armor wire strands superposed around a core, comprising the steps of:
pulling the core along a predetermined line of travel;
wrapping a first layer of spirally wound wire strands about the core at a first station, with each of the strands being subjected to tension force during said wrapping;
wrapping a superposing second layer of wire strands spirally in a generally opposite direction about the core and first layer at a second station spaced apart from the first station and along said line of travel, with each of said strands of the second layer being subjected to tension force during said wrapping;
and applying a predetermined and substantially constant pulling force to the core and first layer in the direction of travel thereof at a point along said line of travel and between said first and second stations by frictionally engaging the outer surface of said first layer, whereby the tension forces on the core and first layer are reduced as the cable passes the point of frictional engagement.

References Cited
UNITED STATES PATENTS

| | | | |
|---|---|---|---|
| 2,098,922 | 11/1937 | McKnight | 57—15 XR |
| 3,005,304 | 10/1961 | Holm | 57—12 |

BILLY S. TAYLOR, *Primary Examiner.*